July 25, 1961 G. W. MOFFITT 2,993,407
MOSAIC MOTION PICTURE PHOTOGRAPHY
Filed July 10, 1956
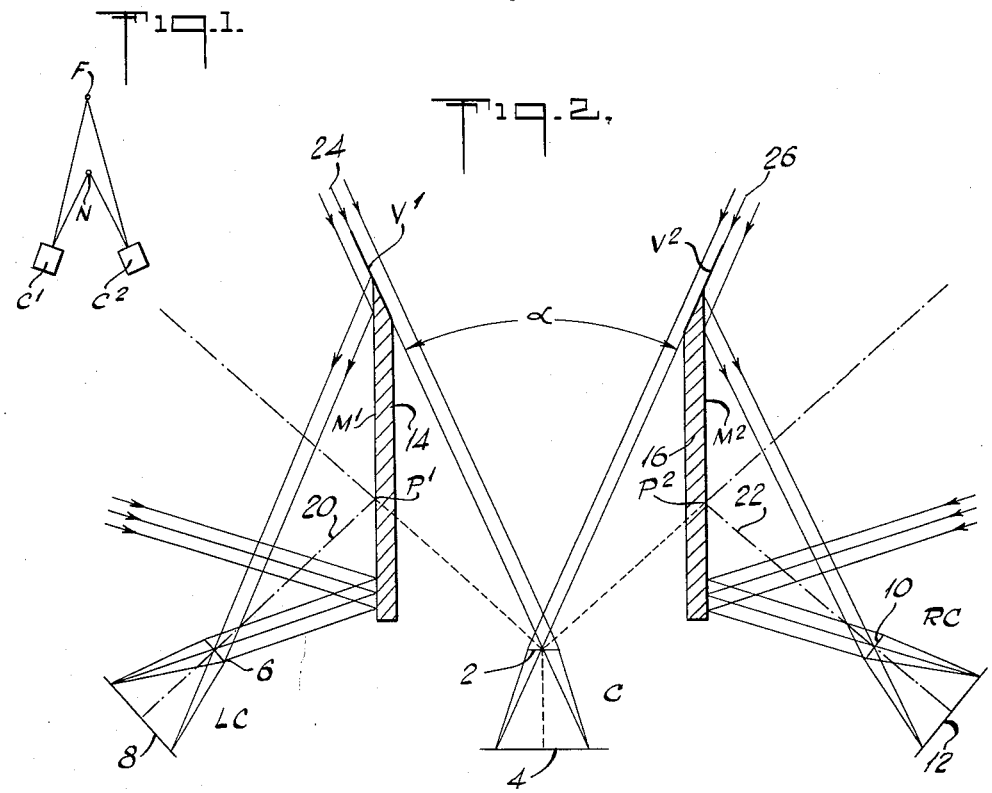
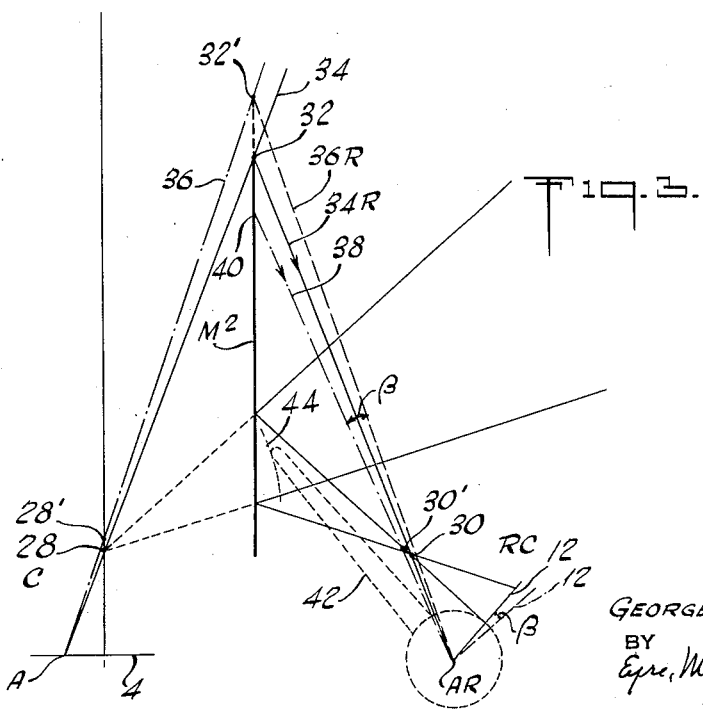
INVENTOR
GEORGE WILBER MOFFITT
BY
Eyre, Mann & Burrows
ATTORNEYS

United States Patent Office 2,993,407
Patented July 25, 1961

2,993,407
MOSAIC MOTION PICTURE PHOTOGRAPHY
George Wilber Moffitt, Ridgewood, N.J., assignor to Smith-Dieterich Corporation, a corporation of New York
Filed July 10, 1956, Ser. No. 596,989
1 Claim. (Cl. 88—16.6)

The present invention relates to mosaic photography, more particularly to mosaic motion picture photography, and comprises a novel camera arrangement which permits simultaneous photographing of different parts of a scene by a plurality of cameras in such manner that the products of the cameras may later be simultaneously projected to reproduce the original scene without mismatching at the junctions of the fields of view of the various cameras, without production of "ghost images" and without parallax. The invention includes also a method for simultaneously adjusting the focus of the various cameras without introduction of error into the reproduced scene.

When a scene is viewed, as by the pupil of a camera lens, from two different positions, the relative position of objects at different distances is different for each camera position. This is the phenomenon known as parallax. In the system of the invention parallax is avoided by so locating a plurality of cameras that the entrance pupils of their lenses optically coincide. This is achieved by so positioning the cameras with respect to reflecting surfaces that the entrance pupil of each camera coincides with the mirror image of that of the adjoining camera. In the case of a three camera system two reflecting surfaces are provided one for each of the two outer cameras. In this manner the three cameras may be positioned to view the scene as from the pupil of the lens of the center camera. The reflecting surfaces define the limits of the respective fields of view of the cameras.

In order to avoid the formation of ghost images on the films of the outer cameras, due to rays of light coming directly to the lenses of such cameras without reflection, opaque non-reflecting shields or vanes are provided at the extremity of each reflecting surface and disposed in the planes defining the limits of view of the center camera. These opaque vanes do not interfere with the light rays intended for the lens of the central cameras but effectively prevent the side cameras from direct view of portions of the field of the center camera.

The cameras employed in the system of the present invention could have lens systems based on any one of the well known methods of achieving images of constant size irrespective of focusing. When cameras with lenses of such types are employed simultaneous change of focus of the cameras presents no problem. However, if the cameras are of the conventional type in which the objective lens is moved relative to the film for change in focus, means must be provided for insuring that the optic center of the system remains at the lens of the central camera and for insuring proper matching in projection at the junction lines of the several views. By the present invention the lens of the central camera is maintained substantially at the optic center of the system and proper matching is insured by correlating during change of focus, rotation of the side cameras and movement of the reflecting surfaces to movement of the camera lenses.

For a better understanding of the invention reference may be had to the accompanying drawings of which FIG. 1 is a diagram explanatory of the phenomenon of parallax;

FIG. 2 is a schematic diagram of the camera system of the invention whereby parallax and ghost images are avoided; and FIG. 3 is a diagram illustrating one arrangement for control of the reflecting surfaces and of the side cameras during change of focus when cameras having conventional lens systems are employed.

In mosaic photography a number of cameras photograph adjacent sections of a wide field; the film from each camera is developed; and transparencies are made. By simultaneous projection onto a screen the original wide scene can be reproduced. The projector is so arranged that where one transparency ends the next begins. If the object field to be photographed is all in substantially one plane no serious problem of photography is encountered. However, when the scene has depth then the question of parallax is introduced and as a result double images of objects in the field occur upon projection.

The following discussion of the simple diagram of FIG. 1 will make clear why, in order to avoid parallax, all cameras must be so positioned as, in effect, to view the scene from a single point.

In FIG. 1 the point F represents a distant object and the point N a nearer object, $C^1$ and $C^2$ are two cameras. If the points F and N appear in the field of view of each camera then in the films, when developed, the point N, on the film developed from camera $C^1$ will appear on the right of the point F whereas on the film developed from camera $C^2$ the point N will appear to the left of point F. Upon projection the films or transparencies may be so arranged that the points F of each camera coincide. In this case two images of point N will be projected. On the other hand, if the projection is such as to make the points N coincide then two images of point F will appear upon projection. This parallax, described for two points F and N, exists for all parts of the field of view and is larger, the larger the difference in distance of the two objects. Parallax depends upon the distance between the viewing points, that is, upon the distance between the two cameras, and can be reduced only by reducing that distance. Thus for complete elimination the two viewing points must be coincident. Therefore in mosaic photography, in order to eliminate mismatching due to parallax, all of the cameras must view their respective portions of the scene from essentially the same point.

In the arrangement diagrammatically illustrated in FIG. 2 the scene is effectively viewed from a single point because the optical center of the system is at a single point. In FIG. 2, which represents diagrammatically a three camera arrangement for mosaic photography, a center camera is indicated at C with its entrance pupil or lens at 2 and its film at 4, a second or left camera is indicated at LC with its entrance pupil or lens 6 and film 8 and a third or right camera is indicated at RC with its entrance pupil or lens 10 and film 12. The center of lens 2 of camera C is the optical center from which the entire field is viewed. In order that the cameras LC and RC may view their respective portions of the field as from the center of lens 2, barriers 14 and 16, which in the particular diagram of FIG. 2 are shown as parallel, are provided on their outer faces with mirrored surfaces $M^1$ and $M^2$. Camera LC is so orientated that the vertical line joining the mid point of the lens 6 with the film 8 and indicated by the dashed line 20 strikes the surface $M^1$ at point $P^1$ such that the distance from the lens 6 to the point $P^1$ equals the distance from the center of lens 2 to the point $P^1$. Similarly camera RC is so positioned that the vertical line 22 passing through the axis of the lens 10 strikes the mirrored surface $M^2$ at a point $P^2$ such that the distance between the point $P^2$ and lens 10 is equal to the distance between point $P^2$ and lens 2. Thus, optically speaking, light rays striking the mirrored surface $M^1$ from the left portion of the field of view and reflected to camera LC form their center at the lens 2 of camera C and similarly light rays striking the mirrored surface $M^2$ and reflected to the camera RC form their optical center at the lens 2 of camera C. With the cameras C, LC and RC positioned as above described the camera C will photograph the central field, included between the angle α, the camera LC will photograph the part of the field to the left of the central section and the camera RC will photograph the part of the field to the right of the central section.

The arrangement so far described avoids parallax and insures matching of transparencies developed from the respective films 4, 8 and 12 when projected simultaneously. The members 14 and 16 at their outer ends are beveled to terminate in knife edges, the angle of bevel being such as not to interrupt the rays within the angle α coming to the center camera. The surfaces of the members 14 and 16 facing the central camera should be blackened and provided with non-reflecting surfaces. To prevent a non-reflected light ray from entering the pupils of the lenses 6 and 10 from past the end of the knife edges, very thin opaque non-reflecting vanes $V^1$ and $V^2$, are mounted on the beveled ends of the members 14 and 16 to extend beyond the beveled ends and in the planes of such beveled ends for a distance sufficient to block rays of light from the central area of the field directed toward the outer cameras.

With the camera arrangement diagrammatically illustrated in FIG. 2 the images obtained on the films 8 and 12 will be reversed relative to that obtained on film 4 but this can be readily taken care of during printing or projection by reversal of the negative or transparency. The part of the field which lies upon the borders between the sections being photographed by the three camera arrangement, that is light rays emanating along the lines 24 and 26 will be reproduced on the films of the two adjoining cameras but with less intensity. This duplication at the border of the images provides means for matching during projection by overlap of the duplicating images. This part of each film is known as the vignette. The width of the vignette depends upon the size of opening of the orifices at the objectives and upon focus of the cameras. The vignettes insure that no part of the scene will be lost when focal distance is reduced.

The schematic arrangement of FIG. 2 has been described as if the second principal points of the objectives were fixed with respect to the films, which could be essentially the case with certain constant magnification types of objective. If, however, cameras with standard type lenses are employed, then means must be provided for insuring matching irrespective of change of focus of the cameras.

In FIG. 3 an arrangement for insuring matching with change of camera focus is disclosed.

FIG. 3 represents diagrammatically one proposed arrangement for permitting use of cameras with conventional type movable objective lenses. In FIG. 3 for simplicity, only the center camera C and the right camera RC are indicated. The mirrored surface $M^2$ is shown only as a line and the center of lens 2 of camera C is represented by the point 28. The corresponding center of lens 10 of camera RC is indicated by the point 30. The position of the knife edge of mirror $M^2$ for infinite focus is indicated by the point 32. Solid arrowed line 34 represents a ray from a distant point, (say infinity) which just passes the knife edge at 32 and passes through the central point 28 of the lens of camera C to a point A on film 4. The solid arrowed line 34R represents the reflected part of the ray 34 which passes through the point 30 of the lens of camera RC and strikes the film 12 at the point AR. If now the focus is to be shortened the lens of camera C is moved forwardly to the point 28' and the lens of camera RC must be moved forward an equal distance along its axis to the point 30'. Now it is obvious that if the projectors are to project equal panels from all films the points A and AR must not move on their respective films during focusing.

Moreover, the images of any point on the boundary line between the fields of the two cameras must always fall on A and AR. This line, for camera C now becomes dashed arrowed line 36, the line which passes through point A and the point 28'. Thus the field of view of the middle camera has become smaller as the result of focusing closer. Consequently the pointing of the right hand camera must be changed in such a way that it will pick up where the middle leaves off. By sliding mirror $M^2$ forward so that its reflecting edge 32 is moved to the point 32' in the line of ray 36, the incoming boundary ray along the line 36 is reflected along the line 36R. At the position 30', however, of the lens of camera RC the boundary line passing through the points AR and 30', is the line 38 intersecting the mirror $M^2$ at the point 40. Accordingly the right hand camera as a unit should be rotated about point AR' through the angle defined by the points 40, AR, 32' or the angle β. Thus by suitable linkage between the lenses, the mirrors and the side cameras, automatic correction and proper matching can be readily achieved with change of focus of the cameras. It will be noted that the forward movement of the mirror is linearly related to the lens movement and therefore they can be interlinked correctly, as by rack and pinion, from one shaft by making the pinion diameters proportional, respectively, to the distances of the point 28 from the points A and 32. By mounting the camera RC to rotate about the point AR and controlling the rotation, as by means of an arm 42 engaging a suitable cam 44 coupled to the mirror, proper orientation of the side camera for each focus of the cameras can be readily achieved. The left hand camera and mirror $M^1$ would, of course, be similarly controlled. No attempt has been made to show any specific mechanical couplings in the diagram of FIG. 3 as the invention is not concerned with any particular mechanical means but with the principle wherein adjustment for change in focus is achieved.

It will be clear from the foregoing description that the invention provides a practical system for mosaic photography that can employ cameras with standard movable objectives or cameras of the type wherein constant field magnitude is insured. A method for control of the camera array during change in focus has been described. As the invention is not concerned with mechanical construction of details of the apparatus, the cameras have been shown purely diagrammatically, and certain parts have been omitted for simplicity. Although the vanes described in connection with the system of FIG. 2 have not been shown in the sketch of FIG. 3 such vanes would be employed in a practical system to prevent the formation of ghost images. The mirrored surfaces have been indicated in each embodiment as being parallel. Such arrangement is not essential as other geometrical arrangements could be employed. It is essential, however, for avoidance of parallax, that the system be optically centered so that each camera, irrespective of the number thereof, will view the scene to be photographed as from a single point.

The following is claimed:

A system for photographing a wide angle scene in sections for mosaic reproduction comprising a vertical wall member positioned with one vertical edge facing the scene to be photographed and having a reflecting plane surface on one side and a non-reflecting surface on the other side, said vertical edge of said wall member being cut away from the non-reflecting to the reflecting side to provide a beveled non-reflecting surface, a horizontally disposed direct view camera having a lens facing a section of the scene and positioned to intercept light rays from the scene parallel to and passing over said beveled surface, a second horizontally disposed camera having a lens positioned to view an adjoining section of the scene by reflection from the reflecting surface of said wall member, the lens of said first camera being positioned at the location of the mirror image of the lens of the second camera, whereby both cameras view their respective sections of the scene as from a single point and a thin opaque vertical vane substantially coplanar with said beveled edge and extending forwardly from the tip thereof toward the scene to prevent receipt of unreflected light rays from the scene by the lens of said second camera.

References Cited in the file of this patent

UNITED STATES PATENTS

| | | |
|---|---|---|
| 1,489,988 | Dickinson | Apr. 8, 1924 |
| 1,801,143 | Defregger | Apr. 14, 1931 |
| 2,461,673 | Anschicks et al. | Feb. 15, 1949 |
| 2,754,722 | Howell et al. | July 17, 1956 |
| 2,828,664 | Hoch | Apr. 1, 1958 |
| 2,896,503 | Smith | July 28, 1959 |

FOREIGN PATENTS

| | | |
|---|---|---|
| 385,423 | France | Mar. 16, 1908 |
| 1,078,237 | France | May 5, 1954 |